Nov. 6, 1951  O. H. BANKER  2,574,431
TRANSMISSION
Filed March 10, 1945  8 Sheets-Sheet 1

INVENTOR.
Oscar H. Banker,
BY
Cromwell, Greist & Warden
ATTYS.

Nov. 6, 1951     O. H. BANKER     2,574,431
TRANSMISSION
Filed March 10, 1945                                  8 Sheets-Sheet 2
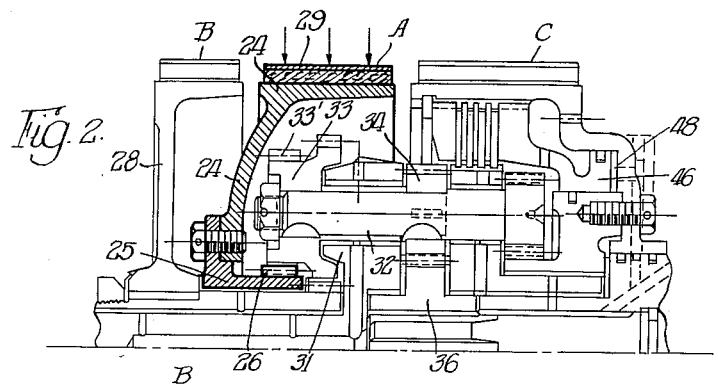
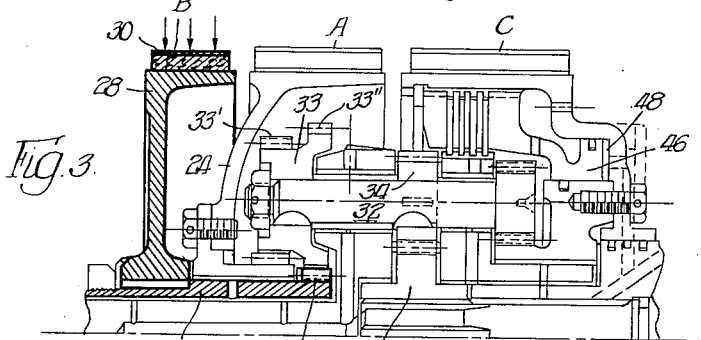
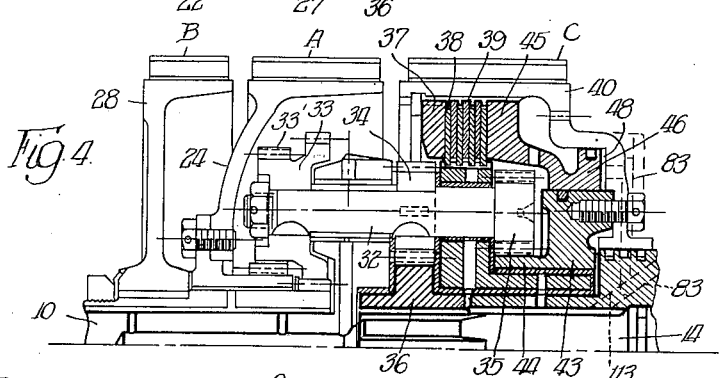
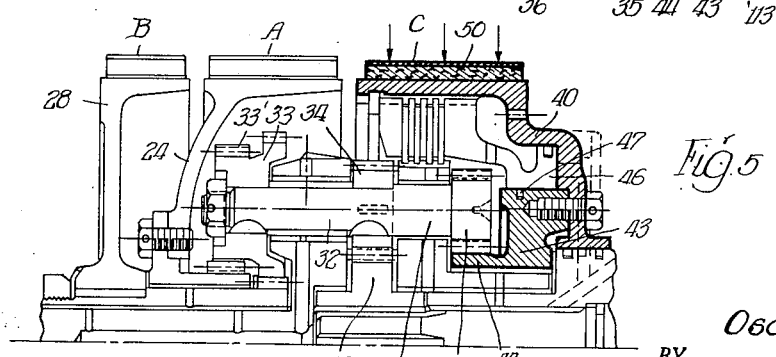
INVENTOR.
Oscar H Banker,
BY
Cromwell, Greist + Warden

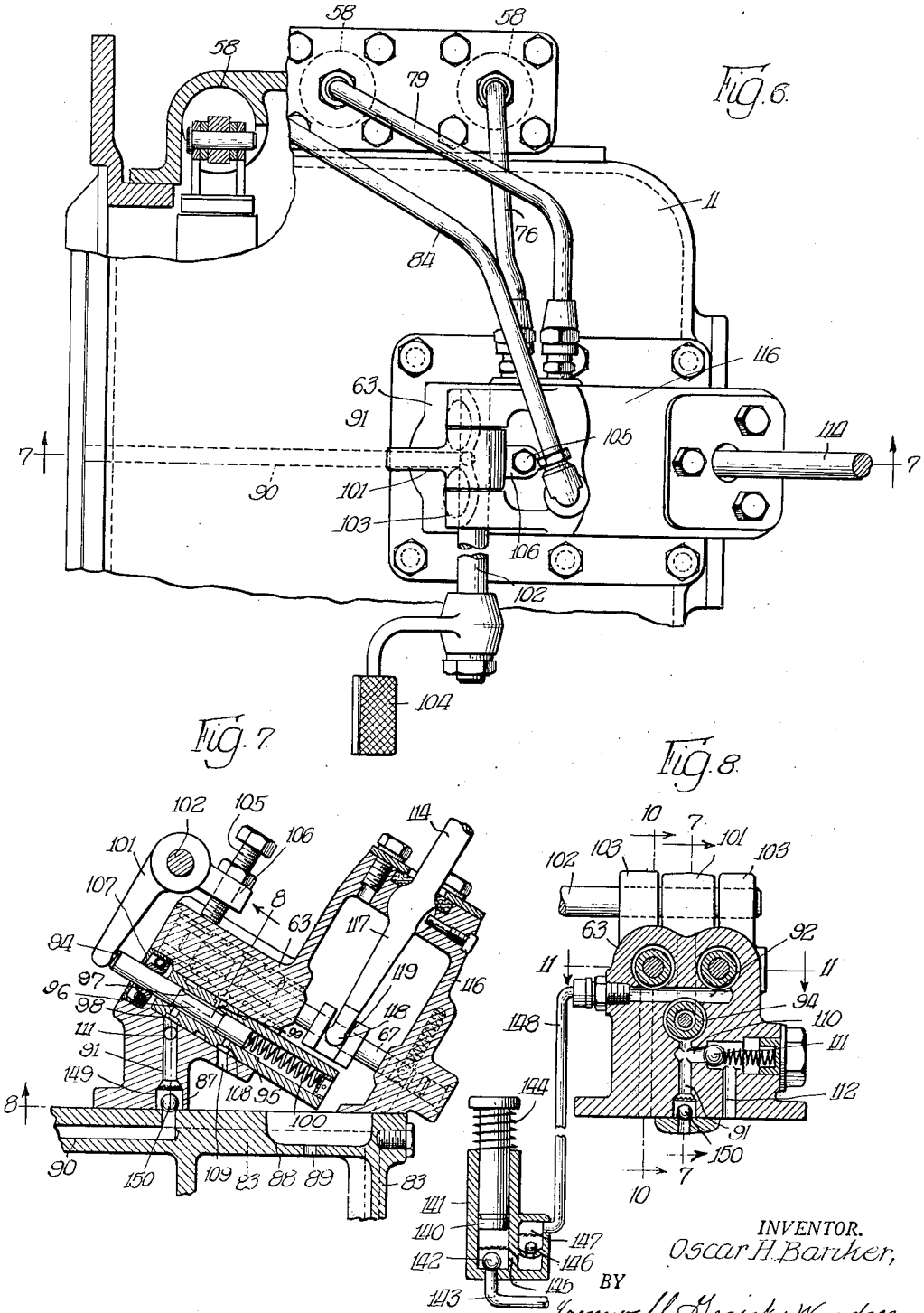

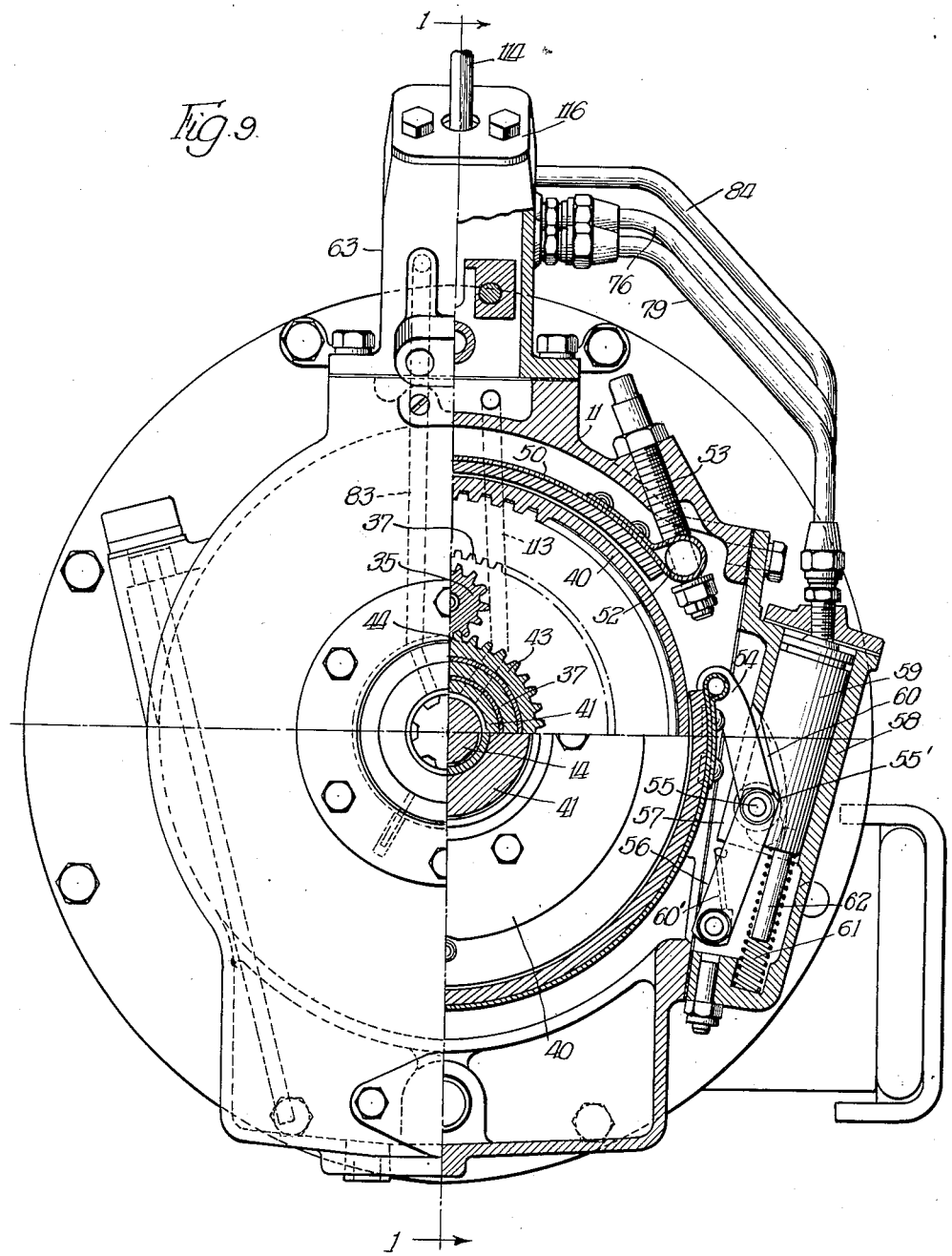

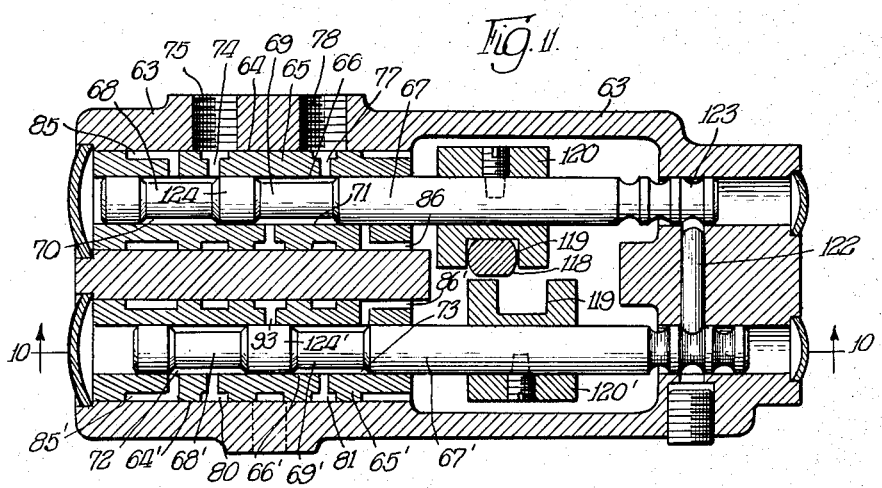
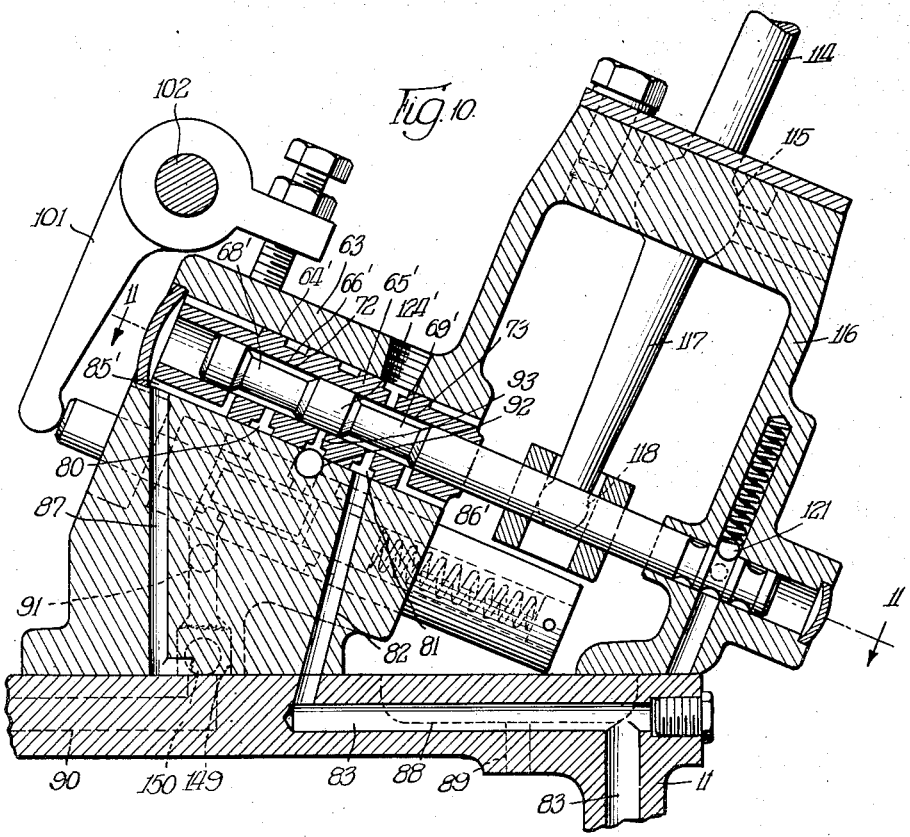

NEUTRAL

LOW

INTERMEDIATE

HIGH

REVERSE

INVENTOR.
Oscar H. Banker.
BY
Cromwell, Greist & Warden
attys

Nov. 6, 1951

O. H. BANKER 2,574,431

TRANSMISSION

Filed March 10, 1945

INVENTOR.
Oscar H. Banker,
BY
Cromwell, Greist & Warden
Atty.

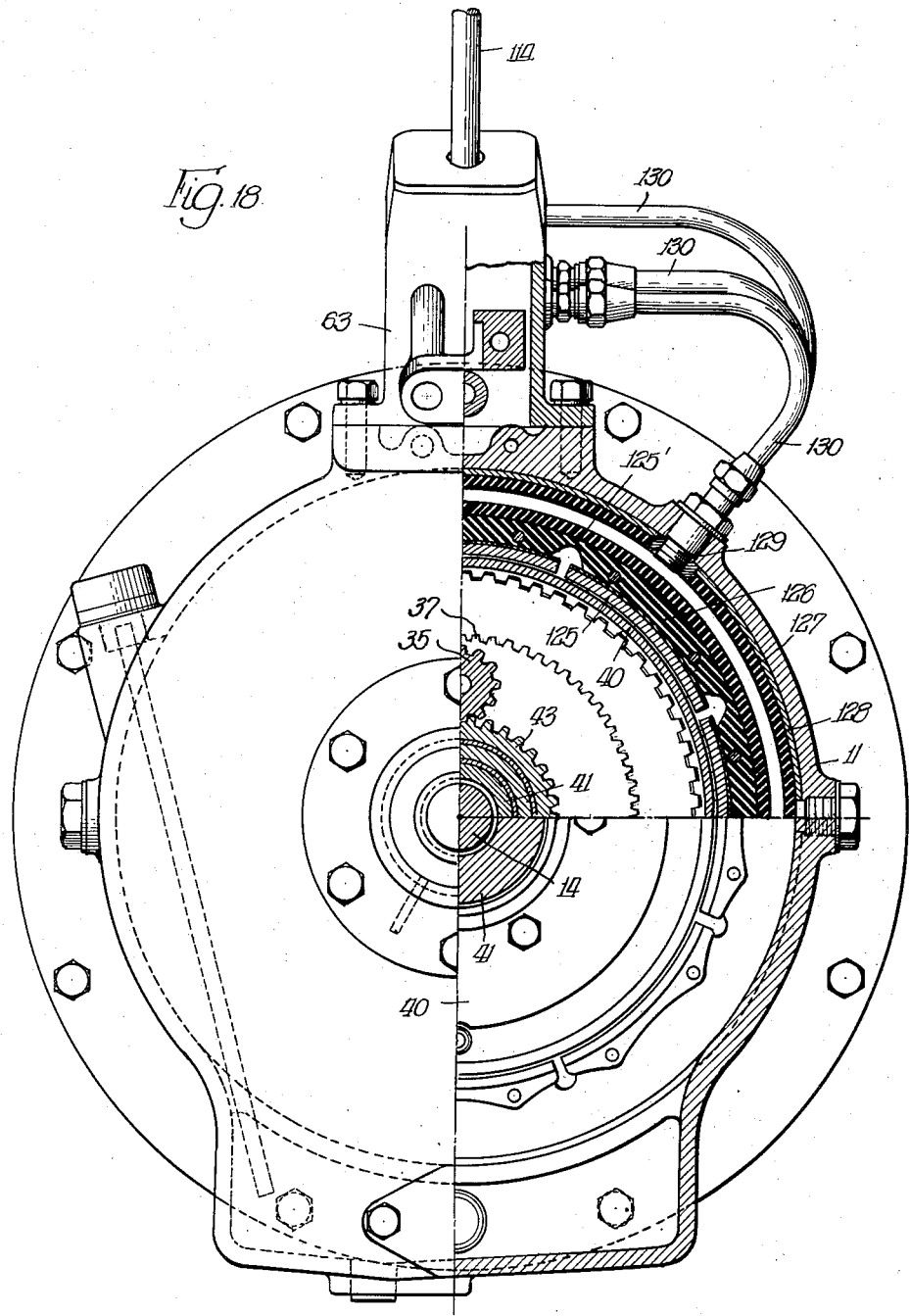

Patented Nov. 6, 1951

2,574,431

UNITED STATES PATENT OFFICE 2,574,431

TRANSMISSION

Oscar H. Banker, Evanston, Ill., assignor to New Products Corporation, Chicago, Ill., a corporation of Delaware Application March 10, 1945, Serial No. 582,061

20 Claims. (Cl. 74—767)

This invention relates to improvements in automotive or like transmissions of the planetary type, more particularly to transmissions of this type which are hydraulically operated and controlled.

It is the general object of the invention to provide a planetary type transmission for automotive and related uses which is very simple, compact and rugged, affording three or more forward speeds and a reverse speed.

It is a further object to provide a planetary transmission of the type described having novel control means associated therewith for bringing a desired speed transmission ratio into effect.

A still further object of the invention is to provide a novel and improved hydraulic control device for a transmission or like device whereby the latter is operated at will with a minimum of moving parts and a maximum of simplicity of construction, and which is unfailingly reliable.

Yet another object is to provide a hydraulic control of the type described for a transmission or like device, which is responsive to manual operation with a minimum of exertion on the part of the operator, and which has provision for rendering ineffective the hydraulic power line governed by said control when desired, by a simple and familiar manipulation, thereby providing a simplified power cut-off feature for the control.

In the drawings,

Fig. 1 is a fragmentary view in vertical longitudinal section taken on a line generally corresponding to line 1—1 of Fig. 9, illustrating structural details of the transmission and control contemplated by this invention, portions of an automotive fly wheel structure associated with said transmission being indicated in broken line;

Figs. 2 to 5 inclusive are schematic views illustrating the operation of the transmission shown in Fig. 1, in obtaining the desired transmission ratios, the portion of the mechanism which is primarily operative in each ratio being shown in heavy line and the remainder in relatively light line;

Fig. 6 is a fragmentary top plane view, partially broken away and in section, illustrating the hydraulic control housing associated with the transmission housing, also the several hydraulic connections and the operating means constituting the control construction;

Fig. 7 is a fragmentary view in vertical section on a line generally corresponding to line 7—7 of Figs. 6 and 8, further illustrating details of the hydraulic control device, in particular a master power release or cut-off valve associated with the latter;

Fig. 8 is a fragmentary view in vertical transverse section through the control device illustrated in Fig. 7, on a line generally corresponding to line 8—8 of Fig. 7, further illustrating structural features of the same, this figure also showing conventionally a booster device for emergency use;

Fig. 9 is a view in end elevation and transverse vertical section on a line generally corresponding to line 9—9 of Fig. 1, illustrating certain structural features of the transmission and also more clearly illustrating the hydraulic control connections for operating the same;

Fig. 10 is a fragmentary view in vertical longitudinal section on a line corresponding to line 10—10 of Figs. 8 and 11, illustrating further details of structure of the hydraulic control device;

Fig. 11 is a view in horizontal longitudinal section on a line corresponding to line 11—11 of Figs. 8 and 10;

Figure 1:
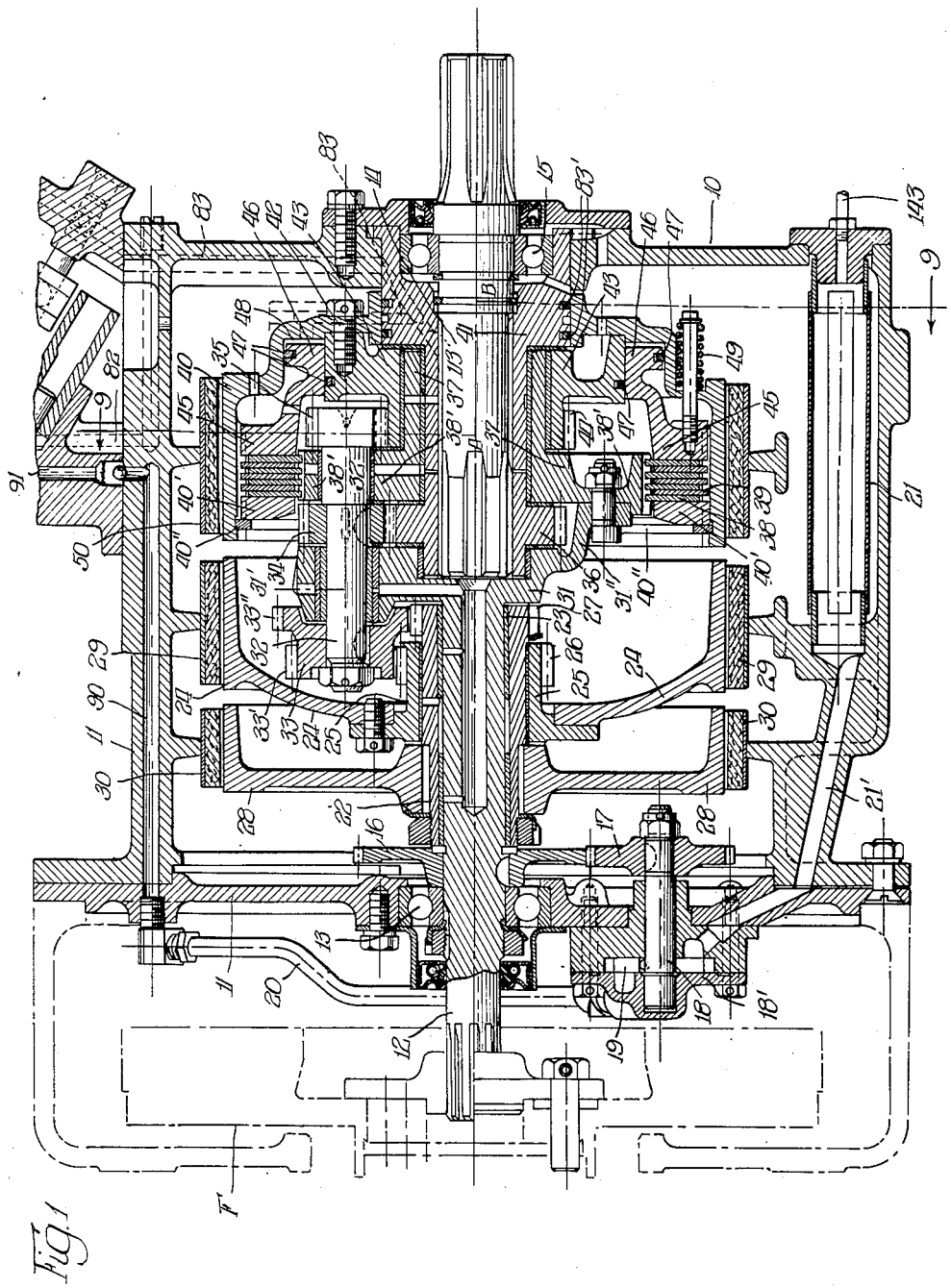
Figure 17:
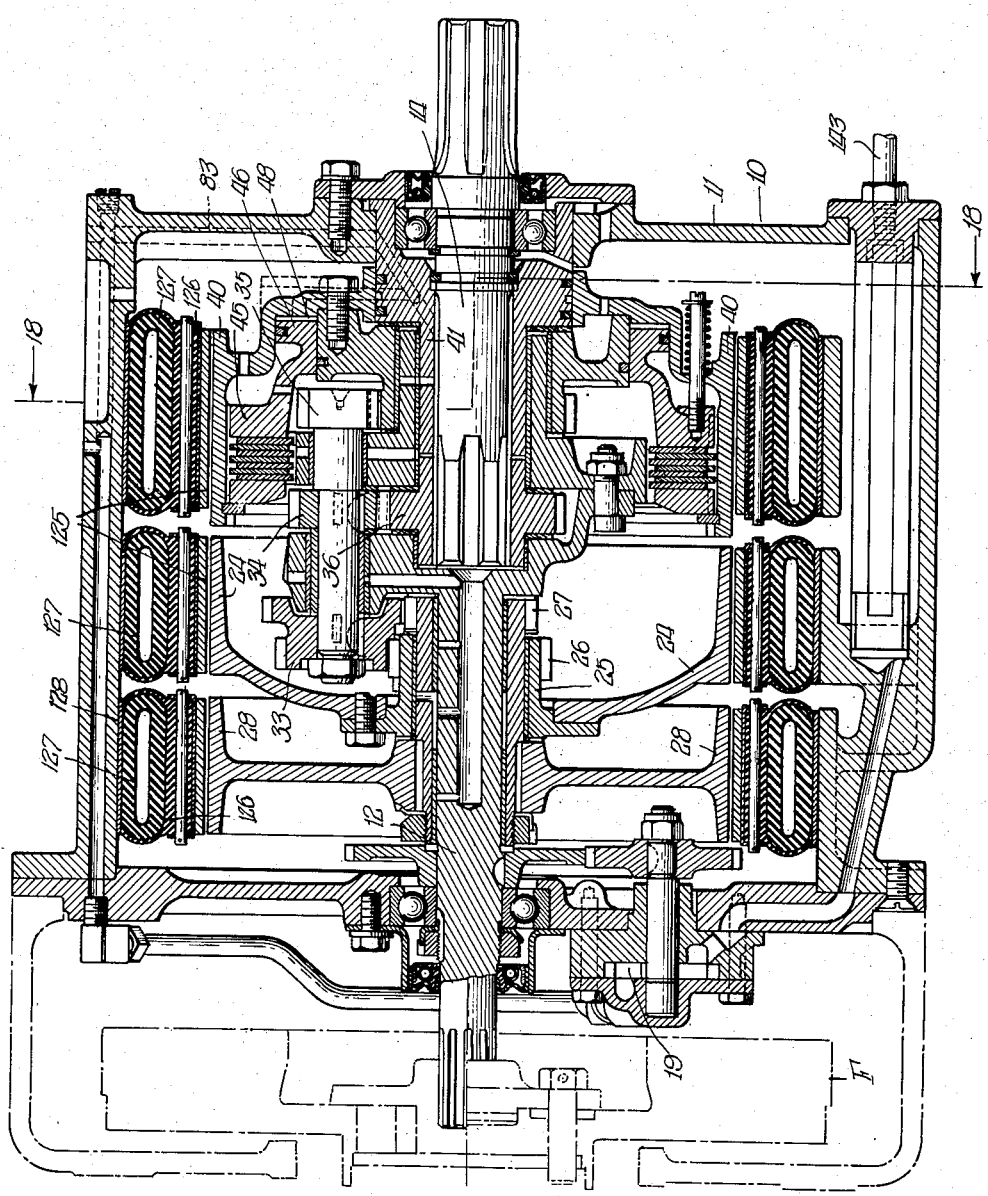

Figs. 12 through 16 inclusive are schematic views taken in section generally similar to that of Fig. 11, illustrating various selective positions of the control instrumentalities of the above control device in securing the four selective speeds of transmission, plus a neutral position;

Fig. 17 is a view generally similar to Fig. 1, illustrating a modified embodiment of the planetary transmission which is well adapted for the purposes of the present invention; and Fig. 18 is a view similar to Fig. 9, being sectioned in part on a line generally corresponding to line 18—18 of Fig. 17, illustrating further features of the modified form.

The present invention provides a transmission of the planetary type well suited for various automotive uses, in particular in trucks, tractors, and the like, which is of exceedingly simple and inexpensive yet rugged and reliable construction. Three or more forward speeds and one speed in reverse are made available. This transmission has incorporated as an important adjunct thereof an improved hydraulic control capable of ready fingertip operation, enabling the obtaining of said forward and one reverse speeds with a minimum of physical effort. In addition, the control includes a very effective master cut-off valve adapted upon manipulation in a simple manner to render the further liquid control valves of the control inoperative, thus cutting off power at the transmission, regardless of the drive phase which otherwise obtains in the transmission by reason of the position of said valves. When released, this master control enables the transmission to be re-engaged in the drive ratio for which the controlling valves happen to be set, without further manipulation by the operator. This hydraulic control arrangement is, needless to say, highly economical of construction inasmuch as it eliminates moving parts to a maximum degree. It is furthermore very positive, reliable and unfailing in operation and contributes much to ease of operation.

Referring to the drawings, the structural features of the mechanical planetary transmission per se will first be described in detail after which reference will be made to details of the control device and its connections to the planetary system for the control and operation of the latter.

Referring to Fig. 1, the reference numeral 10 in general designates the transmission, which comprises a housing 11 in one end wall of which a driving shaft 12 is rotatably mounted as by the ball bearing 13. This driving shaft is connected to the usual fly wheel F shown in broken line and derives its drive from the engine of the automotive vehicle to which the transmission is applied, directly or through a clutch.

A driven shaft 14 coaxial with driving shaft 12 is journaled in ball bearing 15 in the opposite wall of housing 11, said driven shaft being adapted to be appropriately connected through known devices to the propeller shaft or other motive shaft on the vehicle. It will be understood that suitable seals are employed adjacent the shaft bearings to prevent leakage of hydraulic fluid or lubricant or entrance of dirt, dust, etc.

Shaft 12 has keyed thereon a power take-off gear 16, which gear meshes with a pinion 17 immediately beneath the same. Pinion 17 is keyed to a pump impeller shaft 18 which is rotatably mounted in the pump housing 18' bolted to the transmission housing wall, and said shaft drives an appropriate liquid impeller 19 by which a hydraulic fluid (such as a good grade of lubricating oil) is supplied under pressure through a conduit or pipe 20, for the purposes to be described. The liquid is filtered at a strainer 21 and supplied to the pump housing 18' through a conduit 21' communicating with the lower part of the transmission housing, in a manner which will be well understood. These provisions for supplying hydraulic fluid under pressure may be modified as desired and are merely illustrative of suitable means for the purpose noted.

The shaft 12 has a sleeve 22 freely rotatable thereon on bushing means 23 surrounding the shaft, and sleeve 22 has mounted for free rotation thereon, as by a bushing, a hollow annular brake drum 24, the hub 25 of said drum which rotatably supports the latter on the sleeve, being provided with integral sun gear teeth 26. Sleeve 22 immediately adjacent said teeth 26 is provided with similar integral sun gear teeth 27 of smaller pitch diameter than teeth 26, and the opposite end of said sleeve has keyed thereon for rotation therewith a further annular brake drum 28.

Thus drum 24 and its associated gear 26 are freely rotatable on sleeve 22 unless mechanically restrained. This restraining action is performed by an arcuate generally circular brake band or shoe 29 provided internally with friction braking material of well known type and engageable with the periphery of drum 24 to hold the same stationary when the brake band is contracted on the drum. Similarly, drum 28 and its associated sleeve 22 and gear 27 are freely rotatable as a unit on the shaft bushing 23, unless mechanically restrained, and this restraining action is performed by a brake band 30 similar to the band 29 and similarly actuated, in a manner to be described.

At its right-hand end, the driving shaft 12 is conformed to provide an integral spider 31 having radial arms 31' for the support and carrying of the various orbitals or planetary pinions of the transmission. Thus spider 31 has a plurality of planetary stub shafts 32 appropriately mounted for rotation therein on bushings or bearings in arms 31' of the spider, each of said shafts having secured at one end thereof the double planetary pinion 33, at a point medially thereof the orbital driving pinion 34, and at the opposite end thereof the reverse planetary pinion 35. The intermediate driving pinion 34 meshes with and drives a sun gear 36 which is splined to the driven shaft 14.

Referring to Fig. 1, it will be noted that the spider 31 has certain arms 31'' which are bolted to the radial flange of a coaxially disposed sleeve-like clutch member 37, said member being rotatably supported in a manner to be described, whereby said spider 31 and member 37 rotate as a unit at all times when driving shaft 12 is rotating, since the spider is integral with said shaft.

Clutch member 37 has a plurality of spaced annular clutch disks or plates 38 splined on the outer periphery of the radially extending flange 38' thereof, for rotation as a unit therewith, but freely shiftable axially relative thereto. These plates are adapted for coaction with the similar alternately arranged annular clutch plates or disks 39 which are splined on the interior periphery of an annular brake drum 40. An annular clutch thrust or stop member 40' is engaged by the end clutch disk 38 and a retaining ring 40'' carried internally of drum 40 restrains member 40' in the axial direction. The hub of said drum 40 and also the sleeve-like clutch member 37 are rotatably mounted on a shaft bearing member 41 which internally carries the driven shaft bearing 15.

The drum 40 is also secured by bolts 42 to a gear member 43 which is rotatable on the axially extending sleeve of clutch member 37. Gear member 43 carries reaction gear teeth 44 which mesh with the planetary pinion 35, it being noted that the planetary shaft 32 carrying said pinion is supported by a bushing for rotation in the radial flange 38' of clutch member 37.

Accordingly, it will be appreciated that, with drum 40 free to rotate, and with the alternate splined clutch plates 38, 39 engaged, the drum 40 will rotate with spider 31 and shaft 12. Engagement of the multiple clutch plates is effected by an annular pressure foot or ring 45 splined on drum 40 for axial movement relative to the drum and for rotation therewith. This pressure foot is an integral part of an annular piston 46 which is axially slidable on the outer periphery of the gear member 43, and is actuated to the left as viewed in Fig. 1, to apply pressure to the clutch plates, by hydraulic pressure acting on its right-hand side. To this end the annular piston 46 sealingly engages on its inner and outer peripheral surfaces respectively, the outer periphery of gear member 43 and an inner annular surface on the flange of drum 40. Appropriate sealing rings 47 are provided at these points to prevent loss of hydraulic liquid or pressure past the thus constituted annular piston. Hydraulic pressure is applied in an annular cylinder 48 immediately to the right of the piston, as indicated in Fig. 1, by the means to be described.

The construction of drum 40 is worthy of note. This is a one-piece, integral drum machined on its external surface to provide a braking surface and having on its internal periphery the three successive, axially spaced and radially inwardly stepped driving portions, including the splines which coact with clutch disk 39 and pressure foot 45, the intermediate cylinder portion which coacts with the gear member 43 in defining an annular clutch control cylinder, and an end bearing or sealing surface coacting with the bearing member 41 in obtaining a sealed hydraulic distribution connection, to be hereinafter described. This drum is readily machined externally and internally at a single set-up to provide the various operative portions mentioned, enabling a very inexpensive manufacture thereof indeed.

The annular, piston actuated, pressure foot 45 is normally urged to the right, i. e., into position wherein the clutch plates are frictionally inoperative, by means of a coil spring 49, encircling a guide pin secured to said foot and projecting through the side wall of drum 40. Rotation of the drum 40 is adapted to be restrained and halted by a brake band or shoe 50 similar to the bands 29, 30, when such action is desired. Location of the spring 49 externally of the radial drum wall eliminates the need to provide additional space internally of the drum, thereby further compacting the structure as a whole.

With the above description of the transmission structure, reference may be made to Figs. 2 through 5 for a clear understanding of the mode of operation of the planetary system. Assuming that brake band 29 has been applied, by the means to be hereinafter described, so as to halt rotation of drum 24, the other drums 28 and 40 being free to rotate, it follows that the spider 31 will travel rotatively internally of said drum, carrying the double gear 33 in an orbital path around reaction sun gear 26. Since the latter is on the drum and fixed, a predetermined speed of rotation of the smaller pinion 33' of double pinion 33 results and the consequent rotation of planetary driving pinion 34 is transmitted to sun gear 36 on the driven shaft 14. This drives the latter at low speed. See Fig. 2.

For intermediate forward speed the drum 28 is engaged by brake band 30 to halt rotation thereof, the drums 24 and 40 being free to rotate. This has the same result as described above, except that the larger pinion 33" of double pinion 33 travels on stationary sun gear 27 to which the drum 28 is secured, with the result that planetary driving pinion 34 transmits motion to gear 36 and shaft 14 at a higher speed ratio. See Fig. 3.

For high speed operation, all of the drums 24, 28 and 40 are disengaged from their respective brake bands and the clutch pressure foot 45 is actuated to the left by hydraulic pressure applied on annular piston 46 in cylinder 48, so as to frictionally couple drum 40 for rotation as a unit with clutch member 37 and the spider 31 on driving shaft 12. Hence, a direct 1:1 drive ratio results from shaft 12 to shaft 14, since power transmission through the planetary elements is effected by the locked relation of the pinion and sun gear teeth, per Fig. 4.

For reverse operation, the friction clutch is disengaged by interruption of the hydraulic pressure actuating piston 46, and the brake band 50 is engaged with drum 40 to halt rotation thereof. Drums 24 and 28 are free to rotate. In this case planetary pinion 35 travels around reaction or sun gear 44 on the member 43 and the resultant rotation is applied to planetary driving pinion 34 and the gear 36 on the driven shaft. However, the pitch diameter of pinion 35 is so chosen (being smaller than the pitch diameter of the planetary pinion 34) that the result of its driving engagement with reaction gear 44, in the sense of direction of rotation, is to reverse the drive of the driven gear 36. Consequently, the direction of rotation of shaft 14 is reversed. See Fig. 5.

It will be understood by those skilled in the art that the number of forward and/or reverse speeds made available by the above transmission may be increased by the simple expedient of multiplying the number of coacting planetary and reaction members and appropriately selecting the pitch diameters thereof. Thus, pinion 35 could be made a double pinion to afford an additional forward or reverse speed, depending on the size of the pinion and gear elements. To the same end, double pinion 33 could be made triple. Such matters will, of course, suggest themselves immediately to persons skilled in the art, but I desire particularly to call attention to the extreme compactness of the structure which presents these possibilities. The drums 24, 28, 40, which vary in width in accordance with the frictional braking effort exerted thereon to restrain the same, afford ample interior space for the planetary elements and also the high speed clutch structure. The planetary shafts are, nevertheless, journaled at two axially spaced points, so that deflection and unduly destructive wear is practically impossible. I believe that for comparable ruggedness and load capacity the present transmission provides economy of space superior to any known transmission of similar type.

In order to afford an understanding of the versatility of the transmission with regard to attainable speed ratios, the following is an example of the relationships of number of teeth in the various respective planetary pinions and reaction or sun gears:

| Planetary Pinion, Ref. Numeral | No. Teeth | Meshing or Sun Gear, Ref. Numeral | No. Teeth |
|---|---|---|---|
| (Low) 34 | 15 | 36 | 30 |
| 33' | 19 | 26 | 26 |
| (Intermediate) 33'' | 24 | 27 | 21 |
| (Reverse) 35 | 12 | 44 | 33 |

This set-up results in a low-speed drive ratio of 3.16 in forward direction, an intermediate speed drive ratio of 1.77 in the forward direction, and a reverse ratio of 2.67, the shaft 14 rotating in the opposite direction. High-speed ratio is always 1:1, being effected by the locked planetary elements as described.

The above ratios may be modified within wide limits by the simple expedient of altering the number of teeth in a given planetary member, compensating for this alteration by an opposite alteration in the meshing member. Thus, for example, if the teeth of reaction gear 26 are merely decreased by one to twenty-five teeth (with an accompanying increase of teeth in planetary member 33' from 19 to 20), a low-speed forward drive ratio of 2.65 results. Carrying this operation one step further, with 24 teeth in reaction gear 26 and 21 teeth in the planetary pinion 33', a forward drive ratio of 2.33 is accomplished. This diminution of drive ratio may be reversed in an obvious manner. The drive ratio can also be increased by altering the number of teeth in planetary driving pinion 34 and driven shaft sun gear 36. Hence, with 18 teeth in the former and 27 teeth in the latter (as distinguished from the ratio of 15 and 30 in the above illustrative example), a low-speed forward ratio of 4.27 is derived, and this ratio may be increased to 10.2 by the additional increase of the teeth of planetary pinion 33' to 26 and reduction of the teeth in meshing reaction gear 26 to 19.

Corresponding modifications of ratios in any intermediate or reverse gear settings are effected with equal versatility.

In Fig. 9 I illustrate in greater detail, among other things, the structural features of the brake bands 29, 30, 50 for the drums, and the mode of applying and releasing the same. The band 50 appears in this figure; however, it will be understood that the actuating mechanism for each of the brake bands is the same. This member comprises a flexible steel band to the interior surface of which the braking material is applied by riveting, for example, said band being anchored on a pin 52 internally of housing 11. Said pin is adjustable to regulate the amount of brake band and drum clearance, being carried for this purpose by a threaded member 53, adjustable in the wall of the housing 11. The opposite end of the band is hinged to one end of a toggle arm 54, said arm being pivoted at 55 to a second toggle arm 56 which is in turn appropriately pivoted for swinging movement in the housing. The pivoted knee of the thus constituted toggle extends through a slot 57 in the skirt or wall of a hydraulic cylinder 58 formed in or associated with the transmission housing and said cylinder has slidable therein a hydraulically actuated piston 59. Piston 59 is conformed to provide an inclined cam surface 60 at its outer end which is slidably engageable with the pivoted knee of the toggle. Hence, as piston 59 moves downwardly in its cylinder, as viewed in Fig. 9, the toggle is straightened and the brake band constricted into clamping relation to the drum 40 to hold the same stationary. A coil spring 61 serves to urge the piston 59 upwardly, being guided for this purpose by a pin or post 62.

I contemplate that the toggle joint or pivot 55 will be provided with a cam roller engageable with cam surface 60 and have indicated such roller by the reference numeral 55'. This cuts down substantially on the frictional resistance necessary to be overcome at the cam. I have also provided a simple torsion spring 60' encircling the lower pivot of toggle arm 56 and engaging the latter to continuously urge the toggle cam roller 55' against its cam. This at the same time prevents any likelihood of interference of the toggle with the brake band or drum.

There are three sets of pistons 59 and associated toggle connections, acting similarly and similarly actuated, one for each of the bands 24, 28, 40. The pistons, as well as annular clutch operating piston 46, derive their hydraulic control from the control device which is fully illustrated in Figs. 6 through 16 of the drawings.

Referring to those figures, I illustrate a hydraulic control housing or casing 63 bolted on the top of transmission housing 11. Details of this housing are illustrated in Figs. 7, 8, 10 and 11. It is bored out at 64, 64' to receive the hollow cylindrical valve inserts 65, 65', respectively, each of which is in turn provided with a bore 66, 66', respectively, defining a cylinder for the slidable reception of valve plungers 67, 67', these plungers having a close liquid sealing fit in the respective valve cylinder bores. The valve plunger 67 is provided with axially spaced, axially extending portions 68, 69 of reduced diameter, each defined on either axial side thereof by full diameter portions of the plunger, and valve plunger 67' has similar reduced diameter portions 68', 69'. The hollow cylindrical inserts 65, 65' coact with said reduced portions to provide annular valve chambers for purposes to be described. These chambers are, for the purpose of convenience, designated by the reference characters 70, 71, 72 and 73, and it will be evident that the positions thereof are variable axially of the housing 63 in accordance with the position of the plungers 67, 67'. Furthermore, it should be understood that, although Figs. 6, 7, 8, 10 and 11 represent sections of the actual structure of the control device embodied in my transmission, Figs. 12 through 16 inclusive, on the other hand, are somewhat diagrammatic, insofar as the arrangement is concerned, of certain ports, passages, etc. in the control housing, being primarily intended to illustrate the functioning of the control.

Referring to Figs. 10 and 11, the valve insert 65 has a passage 74 therein communicating with a drilled and tapped port 75 in the control housing 63 adapted to communicate the hydraulic liquid with one of the cylinders 58 for actuating a brake piston 59. In this case the communication is established through a pipe 76 (see Fig. 6) leading to the cylinder 58 wherein the piston controlling the braking of drum 40 is located. In other words, hydraulic pressure transmitted through chamber 70, port 75 and pipe 76 is effective on the brake band 50 to halt drum 40 and place the transmission in condition for reverse operation.

Valve insert 65 has a further passage 77 spaced axially of passage 75, opening to a further port 78 in the control housing to which port a pipe 79 is adapted to be threaded. This pipe 79 communicates chamber 71 and passage 77 with the cylinder 58 wherein the piston 59 controlling actuation of low-speed brake band 29 is disposed. Hence establishment of pressure in said line of communication results in the low speed ratio.

The valve insert 65' is likewise provided with a pair of axially spaced passages 80, 81. The latter communicates through a vertical passage 82 bored in the control housing (see Fig. 10), then through a passage 83 bored in the top and side walls of transmission housing 11, with the annular chamber 48 in which the annular piston 46 controlling the actuation of transmission multiple clutch plates 38, 39 is disposed. Reference may be made to Figs. 1 and 9, which show the passage 83 in dotted lines, the same being cored or drilled out in the wall of housing 11 and in the bearing support member 41, as well as including vertical conduit provision in the hub and vertical flange of drum 40. Said hub and support member 41 are appropriately ported at the common bearing surface thereof for the transmission of hydraulic pressure to the annular piston cylinder 48 regardless of the angular position and/or rotation of drum 40, and have sealing rings 83'.

Accordingly, it will be appreciated that hydraulic pressure, when established through valve chamber 73 and passage 81, in passages 82 and 83 and cylinder 48, causes the clutch plates 38, 39 to be engaged by effecting movement of annular piston 46 to the left, thereby establishing the transmission in condition for high speed operation, as described.

The passage 80 in the valve insert 65′ is communicated through an appropriate port in the top of the valve housing 63 by a pipe 84 (see Fig. 6) with the third cylinder 58 in which a piston controlling the actuation of intermediate-speed brake band 30 is disposed. Hence, hydraulic pressure communicated through valve chamber 72, passage 81 and pipe 84 brakes drum 28 and establishes the transmission in a condition for second or intermediate speed operation.

On either opposite axial side of the above described passages 74, 77, 80 and 81, sleeve inserts 65 and 65′ are provided with annular drainage chambers (see Figs. 10 and 11), those to the left being designated 85, 85′, respectively, and those to the right being designated 86, 86′, respectively. The purpose of these passages is to relieve pressure in the respective valve chambers 70, 71, 72 and 73, and likewise in the respective hydraulic connections to the various brake and/or clutch pistons, when the respective pistons are not operative to actuate a brake or clutch. Thus, chambers 85, 85′ communicate through a vertical discharge conduit or conduits 87 bored in the control housing (see Fig. 10) and discharge onto the top of the transmission housing 11 internally of the superimposed control housing. A sump 88 is provided on the top wall of the transmission housing and a drain 89 drilled from the sump through said wall, to lead this released liquid off into the interior of the transmission housing, where it collects at the bottom. The drain chambers 86, 86′ open directly onto the transmission housing wall for similar collection and drain.

The hydraulic liquid in force feed pump 19 is supplied under pressure through pipe 20 as shown in Fig. 1, thence through a supply passage or bore 90 provided in the top wall of the transmission housing 11 in which pipe 20 is tapped, thence through a vertical supply passage 91 drilled in the control housing 63 (see Figs. 6, 7, 8 and 10). This liquid under pressure eventually reaches a central transverse distributor passage 92 which in turn is in communication, through a distribution header 93, with the valve insert bores 66, 66′, respectively, at medial points of the latter, between the discharge passages 74, 77 in the valve insert 65 and discharge passages 80, 81 in the the valve insert 65′.

The present control would be quite operative, and for many purposes very satisfactorily so, if the hydraulic pressure were established directly from the transmission housing supply passages 90 and 91 to the transverse passage 92 and valve insert supply passages 93, in that communication of the hydraulic pressure with any of the respective brake and clutch pistons can well be established and controlled by the shifting of cylindrical valve plungers 67, 67′, or the control established in neutral position by blocking off the last named passages 93. However, in order to provide greater convenience and versatility in the control, hence in the transmission as a whole, I provide a master power cut-off plunger designated by the reference numeral 94 in Figs. 7 and 8. This plunger is slidable in the bore of a hollow valve insert or cylinder 95 which is disposed in the control housing 63 directly below and between the above described valve inserts 65, 65′. The plunger 94 is centrally relieved in diameter at 96 to provide a single annular chamber 97 surrounding the same, and this annular chamber normally communicates downwardly through a port 98 in cylinder 95 with liquid supply passage 91. Chamber 97 also normally communicates upwardly with the distributor passage 92 through a port 99 in insert 95. However, shifting of the plunger 94 downwardly and to the right as viewed in Fig. 7 causes the left end full diameter portion of said plunger to seal off passage 98 and thereby prevent further application of hydraulic pressure through the various fluid connecting means to the pistons of the transmission. Plunger 94 is spring urged to its normal position, in which normal full communication of the hydraulic liquid is established, by means of a coil spring 100 suitably supported in a counterbored recess of insert 95; the plunger is manipulated in the opposite direction to cut-off position by means of a pivoted lever arm 101 which is secured to a shaft 102 pivoted in upstanding ears 103 on the top of the control housing 63. Shaft 102 has a pedal 104 secured thereto (see Fig. 6) and actuation of the pedal results in swing of arm 101 in counterclockwise direction, as viewed in Fig. 7, to thereby interrupt liquid communication and cut-off power to the pistons and clutches, as described. Movement of the arm 101 in clockwise direction is limited by an adjustable set screw 105 which is threaded in an extension 106 on the arm and engageable with the control housing, whereby the arm is adjustably maintained in contact with the exposed end of plunger 94. This plunger extends through the control housing through a suitable liquid seal 107 in a manner which will be apparent to those skilled in the art.

In order to drain off liquid under pressure entering the master control chamber 97 surrounding the relieved portion of plunger 94, I provide a passage 108 in the insert 95 which leads through a drain opening 109 in the control housing to the liquid drainage space atop housing 11, thence to sump 88. Hence, pressure above the master cylinder is relieved in the cut-off position.

From the above description it will readily appear that the master plunger 94 and the operating means therefor afford a convenient device for interrupting hydraulic pressure at any desired time or occasion, regardless of the position of either or both of the speed control plungers 67, 67′. Thus, it is unnecessary to actuate either of said plungers if it is desired to halt power transmission to the vehicle. All that is required is to throw out pedal 104 in the familiar manner of disengaging a clutch pedal of an automotive vehicle. The transmission may be restored to the prior existing condition by simply releasing said pedal.

In order to safeguard against excessive pressures in the control device, I provide a by-pass opening 110 in the control housing immediately below master cylinder 95, in communication with the liquid supply passage 91 entering the same. This passage is normally closed by spring loaded ball valve 111. However, if the pressure becomes excessive, said ball yields and the liquid is by-passed out of the control housing through a discharge passage 112. This by-passed liquid is conveniently availed of as a source of force feed lubrication for the shaft 14 of the transmission through a passage 113 in the transmission housing (see Figs. 1 and 9) generally paralleling the passage 83 through which hydraulic pressure is supplied to the annular clutch piston cylinder 48. Other lubrication conduits communicate with the shaft for similar force feed lubrication.

The shifting of the control plungers 67, 67' is effected by a conventional manually-actuated lever designated by the reference numeral 114 (see Figs. 10 and 11) which is universally pivoted by a ball and socket at 115 in a hollow upstanding extension 116 of the hydraulic control housing 63, at the right of the latter as viewed in Fig. 10. The lower extremity or foot 117 of this lever terminates in a rounded knob 118 which is selectively engageable in the recesses 119 of shipper collars 120, 120' secured respectively to plungers 67, 67'.

The appropriate forward, intermediate or rearward axial position of the aforesaid plungers, to bring a desired line of hydraulic communication into effect, is determined or registered by vertically acting spring-loaded balls 121 in the wall of housing 116, as illustrated in Fig. 10, and by a laterally shiftable cylindrical plug detent 122 (see Fig. 11) rounded at its ends, said balls and plug being engageable in semi-circular circumferential grooves 123 in the plungers. Thus as the plungers are actuated longitudinally, the balls 121 will snap vertically into appropriate registering recesses and the member 122 will similarly be expelled from a recess in the moving plunger and inserted in a recess in the opposed plunger to restrain and render impossible simultaneous movement of the latter, while at the same time indicating to the sense of feel of the operator that the control is set in desired position.

Reference to Figs. 12 through 16 will fully clarify the operation of the valve plungers 67, 67', it being understood that the direction of movement of the latter is just the reverse of the movement of shift lever 114, due to the pivoting of said lever. It will be further assumed that master plunger 94 is in normal inoperative position.

Figure 12:
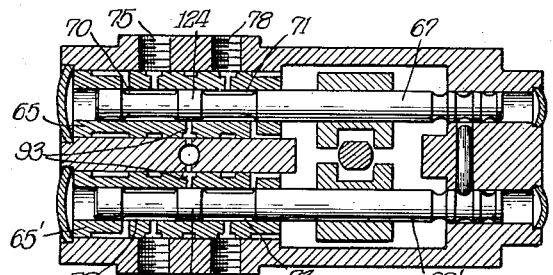

In Fig. 12 I illustrate the parts in a neutral position, in which the supply passage 93 to the respective valve cylinders or inserts 65, 65' is closed off by the full diameter central portions of the plungers, designated 124, 124' respectively. This prevents transmission of hydraulic liquid to any of the brake or clutch pistons, while at the same time the corresponding piston cylinders 58 are exhausted and placed at atmospheric pressure by drain of liquid through chambers 70, 71, 72 and 73 respectively, and the drain passages 85, 85', 86, 86'.

Figure 13:
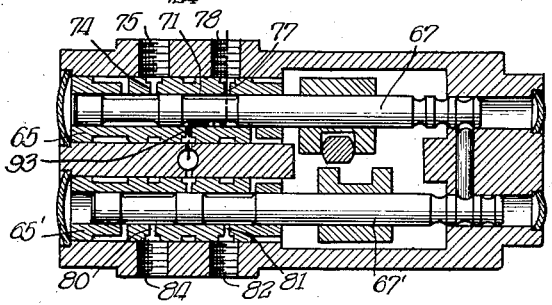

In Fig. 13 I show the position for low speed operation. Here plunger 67' is in neutral position to seal off communication of cylindrical insert 65' with supply or inlet passage 93, while plunger 67 is in advanced position to connect passage 93 through chamber 71 with passage 77 and the piston cylinder for low speed brake band 29.

Figure 14:
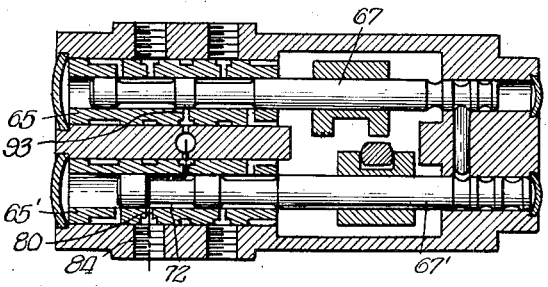

In Fig. 14, showing intermediate speed relation, piston 67 is in neutral position closing off insert 65 from inlet passage 93, while piston 67' is retracted and communicates passage 80, through chamber 72, with the piston cylinder 58 for brake shoe 30 and resultant operation of the transmission in second or intermediate speed. The other chambers are connected to the drain, and this is true in each of the positional relationships of the plungers, so that immediately a brake shoe or clutch is applied, the other corresponding elements are rendered ineffective.

Figure 15:
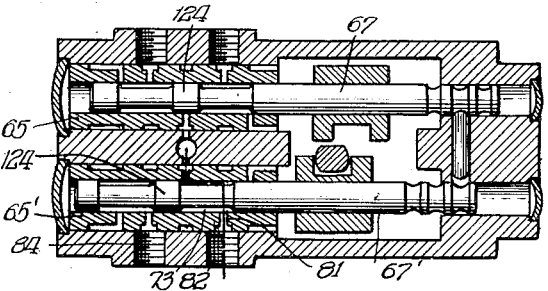

In Fig. 15 I illustrate the positioning of the plungers for high speed operation, in which communication of insert 65 to inlet passage 93 is closed, plunger 67' being in advanced position, whereby passage 93 is communicated through chamber 73, passages 81, 82 and 83 to the annular piston cylinder 48 for actuation of the piston 46 and clutch, locking the spider 31, drum 40 and planetary elements for direct drive at high speed.

Figure 16:
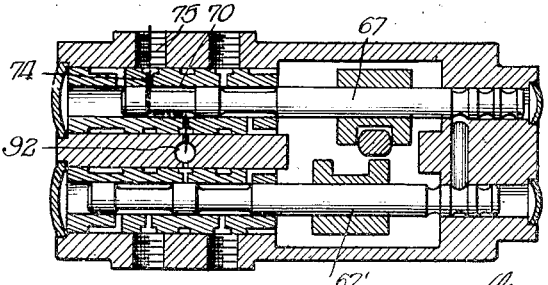

In Fig. 16 the position of the elements for reverse drive is shown, in which plunger 67' closes off inlet passage 93 while plunger 67 in retracted position exposes said passage for communication through chamber 70 and passage 74 to the piston 59 which is effective to apply brake band 50 to drum 40, with resultant reverse drive in the manner described.

The above described transmission and control have important advantages from the standpoint of simplicity, reliability and compactness. The transmission illustrated in Fig. 1 provides a very rugged and strong mount for the planetary pinions and affords a maximum number of speed ratios in proportion to the available space. The hydraulic control and power system is simple and flexible, providing finger tip control for changing speeds, plus a master power cut-off device to interrupt transmission of hydraulic power through the control housing to the transmission, brake and clutch actuating pistons. A minimum of moving parts in such a system results in low cost of production and low maintenance cost.

In Figs. 1, 7, 8 and 10 I illustrate certain details of an emergency booster circuit for the provision of hydraulic pressure under certain conditions when the engine is not operating to drive hydraulic pressure pump 19. Thus, assuming that the vehicle battery is run down and inoperative, so that it is necessary or desirable to start the engine by compression or that it is desired to leave the transmission engaged with the engine shut off, it is first necessary to provide sufficient hydraulic pressure at the control plungers 67, 67' to actuate and maintain the brake bands in whatever speed ratio the plungers are set for. I therefore provide the manually actuated, reciprocating-type booster piston 140 and cylinder 141, said cylinder being communicated by a one-way ball valve 142 with a conduit 143 which is tapped into the lower end of housing 11 in the manner illustrated in Fig. 1, communicating internally of the liquid filter 21. Thus as piston 140 is drawn upwardly, liquid will be drawn under vacuum past valve 142 into cylinder 141. When the piston 140 is actuated downwardly against resistance of coil spring 144, the liquid is expelled outwardly through a discharge passage 145 and one-way ball valve 146 into a discharge chamber 147. This chamber 147 is communicated by a conduit 148 with the control housing 63, being tapped into the latter in axial alignment with the header 92 as illustrated in Fig. 8.

Ball valves 142, 146 prevent flow of liquid in reverse direction when the booster piston 140 is inoperative. Similarly, in order to prevent reversal of flow in the hydraulic supply line 90 in housing 11, I provide internally of the control housing 63, in the manner illustrated in Figs. 7 and 10, a suitable cage 149, wherein is disposed a one-way ball valve member 150 adapted to be readily unseated by liquid under pressure in passage 90, but preventing reverse flow of liquid therethrough.

From the foregoing it will be apparent that as booster piston 140 is actuated, the hydraulic liquid will be drawn and forced from the bottom of housing 11 through conduits 143 and 148 to the liquid supply header 92, thereby furnishing the hydraulic pressure necessary to engage any of the brake bands or clutch under emergency conditions of the type referred to.

In Figs. 17 and 18 I illustrate a somewhat modified embodiment of the invention, like parts being designated by the same reference numerals as employed in connection with Figs. 1 through 16. In this modified adaptation, the brake members, designated by the reference numeral 125, which coact with the respective brake drums, are in the form of circular shoe segments faced with braking material, each of approximately 40° arcuate extent. These shoes are appropriately secured to a suitable resilient, annular supporting member 126, partially subdivided for greater flexibility by portions 125' of reduced radial thickness, which member is in turn bonded or vulcanized to a hollow, circular, resilient, inflatable and deflatable tube 127. The radial outermost wall of tube 127 is appropriately secured or bonded to a liner on an inner surface of the wall 128 of transmission housing 11. The housing wall has a port 129 therein into which hydraulic power transmission pipes or conduits 130 are tapped, these conduits being the equivalent of the pipes 76, 79, 84 of the first embodiment and being similarly connected to and supplied from control housing 63 on the top of the transmission housing.

Hence, the three inflatable tubes 127 and brake shoes 125 thereon perform the same functions in securing low, intermediate and reverse ratios as the pistons and cylinders which control brake bands 29, 30 and 50 of the embodiment of Fig. 1. It will be appreciated that as said hollow tubes are selectively inflated with liquid, under control of the instrumentalities in housing 63 as described above, the brake shoes 125 will be constricted selectively on drums 24, 28, 40 to produce the desired drive ratio.

The multiple disk clutch controlling high-speed drive ratio is actuated by an annular piston 46 identical with that employed in the first embodiment and identically supplied with hydraulic liquid from the control housing.

From the foregoing it will be appreciated that the hydraulic control functions to communicate one or the other of the three conduits 130 with the hydraulic pressure source, in the same manner as is characteristic of the first embodiment, and the tubes 127 will be inflated, causing the resilient support 126 to be constricted radially with resultant selective application of brake shoes 125 to the respective brake drums 24, 28 or 40. This embodiment represents a high degree of simplification, entirely eliminating the pistons 59 and cylinders 58 and brake band actuating linkage of Fig. 9; it is very effective for the desired purposes. When the hydraulic pressure is broken, the tube 127 returns resiliently to a comparatively deflated condition so as to withdraw the previously actuated shoe from the brake drum and render the same freely rotatable. Other than in the respects described, the two embodiments are identical and have equivalent features of advantage.

Various specific features of advantage in one or the other or both of the above described embodiments are worthy of specific note. Thus, referring to Fig. 1, it is evident that the transmission embodies what is in effect a continuous driving-driven shaft construction supported at both opposite ends by the housing 11. In other words, driving shaft 12 is carried by ball bearings 13, while the clutch member 37, bolted to a spider 31 integral with shaft 12, also has an elongated and very stable bearing on the bearing member 41 at the opposite side of the housing. This member 41 is mutually supported by the clutch member 37 and is in turn carried by a ball bearing at said opposite end; the net effect is a very sturdy support for the driving and driven shafts, effectively resisting springing and serving as a continuous backbone for the transmission. This is in clear distinction over existing planetary transmission wherein each end of the shafting is independently carried rotatively at only one point. My structure has what amounts to a single unitary shaft backbone extending through the housing, which eliminates chance of misalignment of the shafts and undue wear. I consider that this mutual supporting and journaling of one of the shafts by the other is of great importance in this invention.

It should likewise be noted that the transmission incorporates, in effect, the splitting of the drive shaft (which in fact consists of shaft 12, spider 31 and clutch member 37) into two parts, between which parts the planetary elements are housed. This amounts to a great economy of space and is primarily responsible for a great share of the compactness of this transmission. The housing of reaction gears 26, 27 and double gear 23 within drum 24 and the location of planetary elements 33, 35 on opposite sides of the planetary driving pinion 34 further contribute to this compactness.

A further feature of advantage resident in the first described embodiment of the invention is the considerable multiplication of braking power developed by the toggle arrangements for actuating the brake bands 29, 30, 50. With this structure, relatively moderate hydraulic pressure suffices to insure very effective frictional stoppage of the drums.

Yet a further improved feature exists in the combination of the functions of a bearing and of a hydraulic distributing element in bearing member 41. The hydraulic pressure is communicated through the housing wall and radially through said member to annular cylinder 48 without loss or leakage, due to the presence of sealing rings 83', whether the drum 40 is rotating prior to stoppage or is in stationary position.

Advantages of the master hydraulic cut-off have been pointed out above. While I have illustrated this feature as being controlled by the lever 101 operated by a separate pedal 104 (see Fig. 6), it should be clearly understood that the manipulation of plunger 94 may be controlled in other fashions.

By arranging the reverse driving planetary element 35 on the driven shaft side of the driving pinion 34 and gear 36, I have compacted the overall assembly. The relatively small diameter pinion 35 is readily receivable in the space interiorly of drum 44, whereas the larger forward driving pinions 33', 33" on the opposite side of said driving elements 34, 36 occupy greater radial space. Such enlarged space provisions are found interiorly of brake drum 44. I consider this splitting of the driving elements and their coacting reaction elements to be noteworthy in this invention.

A still further feature of the invention consists in the provision on the driving shaft 12 of the power take-off gear 16 and the association therewith of the meshing pump drive gear 17. This contributes yet another factor of compactness of the assembly, with reference to the hydraulic power provisions.

Other aspects of improvements will suggest themselves to those skilled in the art. Similarly, modifications in the disclosed structures will readily appear upon an understanding of the above. I therefore desire that the invention should be interpreted broadly within the scope of the appended claims.

What I claim is:

1. Control structure for the plural operating means of a transmission or like apparatus, comprising a source of fluid under pressure, a control chamber in communication with said source and having fluid connections to said respective operating means, a control member acting in said chamber to control selectively the transmission of fluid from said source to said respective connections, a further chamber between and in communication with said source and first named control chamber, a master device in said further chamber actuable to cut off transmission of fluid pressure from said source to said control chamber, means for actuating said last named device and member, and a manually actuable booster device having a fluid pressure supply line connected to said control chamber.

2. Control structure for the plural operating means of a transmission or like apparatus, comprising a source of fluid under pressure, a control housing in communication with said source having fluid connections to said respective operating means, a control bore in said housing, said bore being in communication with said source and said fluid connections, a control plunger reciprocable in said control bore, said plunger being operable to control selectively the transmission of fluid from said source to said respective connections, a further bore in the housing located between and in communication with said source and first named bore, a master plunger actuable in said further bore to cut off transmission of fluid pressure from said source to said control bore, means for actuating said control and master plungers from the exterior of said housing, and a manually actuable booster device having a fluid pressure supply line connected to said control bore.

3. Control structure for the plural operating means of a transmission or like apparatus, comprising a source of fluid under pressure, a control housing in communication with said source having fluid connections to said respective operating means, a control bore in said housing, said bore being in communication with said source and said fluid connections, a control plunger reciprocable in said control bore, said plunger being operable to control selectively the transmission of fluid from said source to said respective connections, a further bore in the housing located between and in communication with said source and first named bore, a master plunger actuable in said further bore to cut off transmission of fluid pressure from said source to said control bore, means for actuating said control and master plungers from the exterior of said housing, and a manually actuable booster device having a fluid pressure supply line connected to said control bore.

4. Control structure for the plural operating means of a transmission or like apparatus, comprising a source of fluid under pressure, a control housing in communication with said source having individual fluid connections to said respective operating means, a control bore in said housing, said bore being in communication with said source and said fluid connections, a control plunger reciprocable in said control bore, said plunger being operable to control selectively the transmission of fluid from said source to said respective connections, a further bore in the housing located between and in communication with said source and first named bore, a master plunger actuable in said further bore to cut off transmission of fluid pressure to said control bore, means for actuating said control and master plungers from the exterior of said housing, and a manually actuable booster device having a fluid pressure supply line connected to said control bore.

5. In a planetary transmission of the type described, a housing, a shaft rotatably mounted in one wall of the housing, a second shaft in axial alignment with said shaft, a bearing member mounted in an opposite wall of the housing in axial alignment with said first shaft, through which bearing member said second shaft extends, said first shaft having a planetary carrier secured thereto which is rotatably carried by said bearing member, whereby to constitute in effect a continuous shafting rotatably supported at opposite sides of said housing, meshing planetary and reaction gearing carried by and operatively connected to said carrier and shafting, including a sun gear on said second shaft having an internal bearing in said carrier, and means for controlling said gearing to effect the drive therethrough of one of said shafts from the other in a plurality of speed ratios.

6. In a planetary transmission of the type described, a housing, a shaft rotatably mounted in one wall of the housing, a second shaft in axial alignment with said shaft, a bearing member mounted in an opposite wall of the housing in axial alignment with said first shaft, in which bearing member said second shaft is rotatably supported, said first shaft having a planetary carrier secured thereto which is rotatably carried by said bearing member whereby to constitute in effect a continuous shafting rotatably supported at opposite sides of said housing, meshing planetary and reaction gearing carried by and operatively connected to said carrier and shafting, including a sun gear on said second shaft having an internal bearing in said carrier, and means for controlling said gearing to effect the drive therethrough of one of said shafts from the other in a plurality of speed ratios.

7. In a planetary transmission of the type described, a housing, a shaft rotatably mounted in one wall of the housing, a second shaft in axial alignment with said shaft, a bearing member mounted in an opposite wall of the housing in axial alignment with said first shaft, in which bearing member said second shaft is rotatably supported, said first shaft having a planetary carrier secured thereto which is rotatably carried by said bearing member whereby to constitute in effect a continuous shafting rotatably supported at opposite sides of said housing, meshing planetary and reaction gearing carried by and operatively connected to said carrier and shafting, and means for controlling said gearing to effect the drive therethrough of one of the shafts from the other, including a sun gear on said second shaft having an internal bearing in said carrier and a reaction member rotatably mounted on said carrier.

8. In a planetary transmission of the type described, a housing, a shaft rotatably journaled in one wall of the housing a planetary carrier secured to said shaft having planetary gearing thereon, an elongated bearing member mounted in an opposite wall of the housing in axial alignment with said shaft, a second shaft aligned axially with said first shaft and rotatively carried by said bearing member, and gearing on said second shaft meshing with said planetary gearing, said carrier being telescoped a substantial distance on and rotatably supported by said bearing member and said second shaft having a sun gear thereon rotatably journaled by said carrier, whereby to constitute in effect a continuous shafting for the axially aligned carrier and shafts rotatively supported at opposite sides of said housing.

9. In a planetary transmission of the type described, a housing, a shaft rotatably journaled in one wall of the housing, a planetary carrier secured to said shaft having planetary gearing thereon, an elongated sleeve-like bearing member mounted in an opposite wall of the housing in axial alignment with said shaft, a second shaft aligned axially with said first shaft and rotatively carried by said bearing member, and gearing on said second shaft meshing with said planetary gearing, said carrier being telescoped a substantial distance on and rotatably supported by said bearing member by a bearing surface of substantial axial length inwardly of the second shaft bearing thereon and said second shaft having a sun gear thereon rotatably journaled by said carrier, whereby to constitute in effect a continuous shafting for the axially aligned carrier and shafts rotatively supported at opposite sides of said housing.

10. In a planetary transmission of the type described, including aligned driving and driven shafts and a drum rotatable relative thereto, a bearing concentrically receiving one of said shafts and journaling the other, fluid pressure-actuated clutch means drivingly connected to said driving shaft and to said drum respectively, said clutch means functioning when actuated to drivingly couple the driven shaft to the driving shaft, a fluid pressure-responsive device in said drum to actuate said clutch means, and means including a conduit within said drum and a further conduit in said bearing opening thereto for communicating said device with a source of fluid under pressure to thereby actuate the clutch means.

11. In a planetary transmission of the type described, including aligned driving and driven shafts and a drum rotatable relative thereto, a bearing concentrically receiving one of said shafts and journaly the other, fluid pressure-actuated clutch means drivingly connected to said driving shaft and to said drum respectivly, said clutch means being disposed in its entirety internally of the space within the drum and functioning when actuated to drivingly couple the driven shaft to the driving shaft, a fluid pressure-responsive device in said drum to actuate said clutch means, and means in said bearing and drum for communicating said device with a source of fluid under pressure to thereby actuate the clutch means.

12. A planetary transmission of the type described, comprising driving and driven shafts, a drum rotatable relative to said shafts, fluid pressure-operated clutch means rotatable with the drum and with the driving shaft respectively, said means being adapted when actuated to drivingly couple the drum with the driving shaft, a fluid pressure-responsive element rotatable with said drum and operative to actuate said clutch means, a bearing rotatively supporting said drum and shafts in concentric, axially telescoped relation, said drum and bearing having coacting conduit means for communicating said pressure-responsive element with a source of fluid under pressure to thereby operate the same, means to vary the rotation of said drum and meshing planetary means carried by said shafts and drum effective to actuate the driven from the driving shaft when said clutch means is actuated or when rotation of said drum is varied.

13. A planetary transmission of the type described, comprising aligned driving and driven shafts, a driven member rotatable relative to said shafts, fluid pressure-operated clutch means rotatable with the member and with the driving shaft respectively, said means being adapted when actuated to drivingly couple the member with the driving shaft, a fluid pressure-responsive element rotatable with said member and operative to actuate said clutch means, a bearing rotatively supporting said drum and shafts in concentric, axially telescoped relation, said member and bearing having coacting conduit means for communicating said pressure-responsive element with a source of fluid under pressure to thereby operate the same, and meshing planetary means carried by said shafts effective to actuate the driven shaft from the driving shaft when said clutch means is actuated.

14. A planetary transmission of the type described, comprising aligned driving and driven shafts, a drum rotatable relative to said shafts, fluid pressure-operated plural clutch means disposed internally of said drum and rotatable with the drum and with the driving shaft respectively, said means being adapted when actuated to drivingly couple the drum with the driving shaft, a fluid pressure-responsive element disposed in and rotatable with said drum and operative to actuate said clutch means, a bearing rotatively supporting said drum and shafts in concentric, axially telescoped relation, said drum and bearing having coacting conduit means for communicating said pressure-responsive element with a source of fluid under pressure to thereby operate the same, means to vary the rotation of said drum and meshing planetary means carried by said shafts and drum effective to actuate the driven shaft from the driving shaft when said clutch means is actuated or when rotation of said drum is varied.

15. A planetary transmission of the type described, comprising aligned driving and driven shafts, a hollow rotatable drum coaxial with said shafts, a bearing internally receiving one of said shafts and externally journaling the other shaft and drum, clutch means comprising coacting clutch elements operative to drivingly connect the drum with one of the shafts, meshing gearing carried by said shafts and drum, said clutch means being actuable to drivingly couple said one shaft and the drum with the other shaft through said gearing, a cylinder carried by said drum, a piston reciprocable relative to the drum in said cylinder and operatively connected to the clutch means for actuation thereof, and means for connecting said cylinder with a source of fluid under pressure.

16. A planetary transmission of the type described, comprising aligned driving and driven shafts, a hollow rotatable drum coaxial with said shafts, a bearing internally receiving one of said shafts and externally journaling the other shaft and drum, clutch means comprising coacting clutch elements disposed internally of said drum and operative to drivingly connect the drum with one of the shafts, meshing gearing carried by said shafts and drum, said clutch means being actuable to drivingly couple said one shaft and the drum with the other shaft through said gearing, an annular cylinder coaxial with and defined internally by said drum, a piston reciprocable relative to the drum in said cylinder and operatively connected to the clutch means for actuation thereof, and means for connecting said cylinder with a source of fluid under pressure.

17. A fluid pressure control for a transmission of the type including devices selectively actuable to effect a desired speed ratio of power transmission between two shafts and plural fluid pressure actuated operating means operatively connected to said devices to actuate the same, said control comprising a control chamber in communication with a source of fluid under pressure and communicable with said operating means, a control member acting in said chamber to control distribution of said fluid from the source to the respective operating means, a further chamber between and in communication with said source and first named chamber, a master control element actuable in said further chamber to interrupt application of fluid pressure to said control chamber, means to operate said member and element, and a manually actuable booster operatively connected to said control chamber to transmit fluid under pressure thereto.

18. A fluid pressure control for a transmission of the type including brake devices selectively actuable to effect a desired speed ratio of power transmission between two shafts and plural fluid pressure actuated operating means operatively connected to said devices to actuate the same, said control comprising a control bore in communication with a source of fluid under pressure and communicable with said operating means, a control member reciprocable in said chamber to control distribution of said fluid from the source to the respective operating means, a further bore between and in communication with said source and first named bore, a master control element reciprocable in said further bore to interrupt application of fluid pressure to said control bore, means to operate said member and element, and a manually actuable booster operatively connected to said control chamber to transmit fluid under pressure thereto.

19. In a transmission of the type described, a housing, a planetary carrier and aligned driving and driven shafts to one of which said carrier is rotatively fixed, an axially hollow bearing in a wall of the housing, said bearing journaling said one of said shafts and said carrier rotatively on one radial side thereof and housing the other shaft on the other radial side thereof, said bearing having conduit means therein for the distribution of a control fluid under pressure.

20. In a transmission of the type described, a housing, a planetary carrier and aligned driving and driven shafts to one of which said carrier is rotatively fixed, an axially hollow, elongated bearing in a wall of the housing, said bearing externally journaling said one of said shafts and said carrier rotatively on one radial side thereof and internally housing the other shaft on the other radial side thereof, said bearing having conduit means therein opening to the bearing surface thereof for the distribution of a control fluid under pressure.

OSCAR H. BANKER.

REFERENCES CITED

The following references are of record in the file of this patent:

UNITED STATES PATENTS

| Number | Name | Date |
|---|---|---|
| 963,092 | Sundh | July 5, 1910 |
| 1,462,740 | Cotal | July 7, 1923 |
| 1,607,986 | Jones et al. | Nov. 23, 1926 |
| 1,657,858 | Ford | Jan. 31, 1928 |
| 1,673,863 | Brown | June 19, 1928 |
| 1,758,597 | Ford | May 13, 1930 |
| 1,896,440 | Durig | Feb. 7, 1933 |
| 1,979,488 | Perez | Nov. 6, 1934 |
| 1,991,124 | Sharpe | Feb. 12, 1935 |
| 2,035,054 | Durig | Mar. 24, 1936 |
| 2,055,325 | Woolson | Sept. 22, 1936 |
| 2,069,408 | Forichon | Feb. 2, 1937 |
| 2,088,782 | Ford | Aug. 3, 1937 |
| 2,098,125 | Yoxall | Nov. 2, 1937 |
| 2,105,755 | Patterson | Jan. 18, 1938 |
| 2,150,950 | Thoma | Mar. 21, 1939 |
| 2,158,054 | Bradbury | May 16, 1939 |
| 2,162,788 | Patterson | June 20, 1939 |
| 2,193,304 | Thompson | Mar. 12, 1940 |
| 2,254,335 | Vincent | Sept. 2, 1941 |
| 2,282,517 | Hill | May 12, 1942 |
| 2,288,594 | Neracher | July 7, 1942 |
| 2,319,388 | Cotterman | May 18, 1943 |
| 2,328,392 | Neracher | Aug. 31, 1943 |
| 2,371,828 | Kuhns | Mar. 20, 1945 |

FOREIGN PATENTS

| Number | Country | Date |
|---|---|---|
| 790,453 | France | Nov. 21, 1935 |
| 11,955 | Great Britain | May 23, 1907 |
| 231,639 | Great Britain | Apr. 9, 1925 |
| 516,737 | Germany | Nov. 29, 1932 |